J. C. LIBE.
Combined Poker and Tongs.

No. 162,080.  Patented April 13, 1875.

Witnesses  Inventor
John C. Libe,
By Connolly Bros,
Attorneys

UNITED STATES PATENT OFFICE.

JOHN C. LIBE, OF PHILADELPHIA, PENNSYLVANIA.

IMPROVEMENT IN COMBINED POKERS AND TONGS.

Specification forming part of Letters Patent No. 162,080, dated April 13, 1875; application filed March 2, 1875.

*To all whom it may concern:*

Be it known that I, JOHN C. LIBE, of Philadelphia, in the county of Philadelphia and State of Pennsylvania, have invented a certain new and useful Combined Poker, Tongs, Rake, Scraper, and Stove-Plate and Pot Lifter; and I do hereby declare the following to be a full, clear, and exact description of the invention, such as will enable others skilled in the art to which it pertains to make and use it, reference being had to the accompanying drawings, which form part of this specification, in which—

Figure 1:
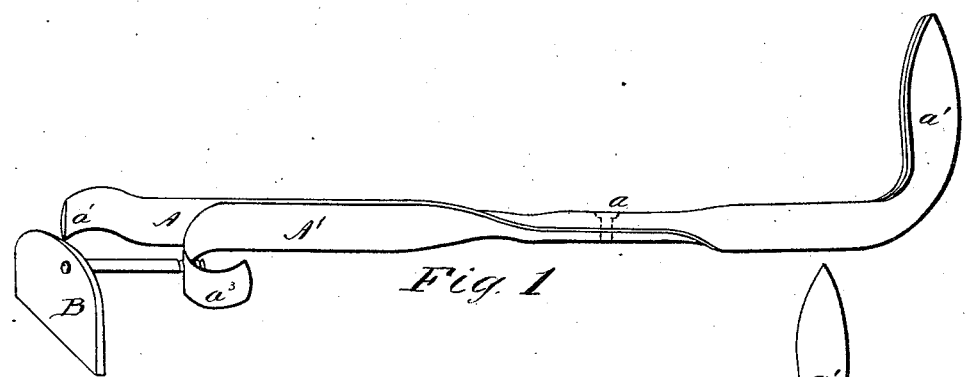
Figure 2:
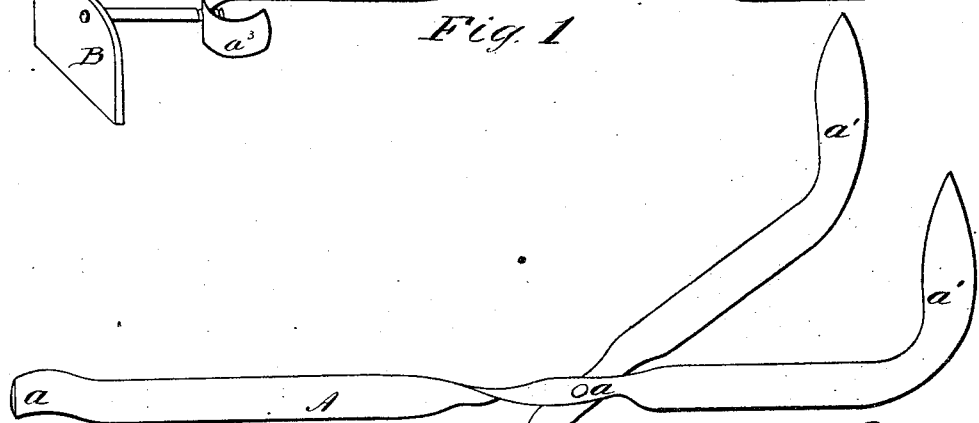
Figure 3:
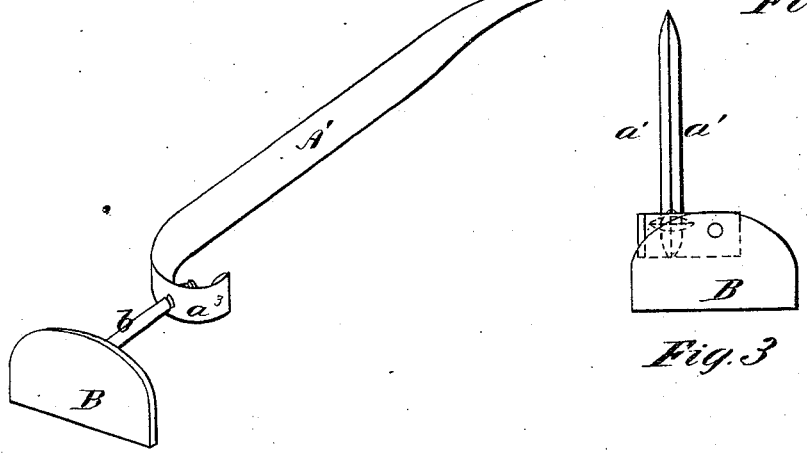

Figures 1 and 2 are perspective views, and Fig. 3 an end view, of my invention.

This invention has relation to an implement adapted for use around stoves and fire-places, and subserving the purposes of a poker and tongs; and it consists in the combination, with a suitably-constructed utensil of the character specified, of a convenient scraper, for removing soot and ashes.

Referring to the accompanying drawings, A A' designate a pair of levers made of one-half round iron bars, having a peculiar twist at their middle parts, where they are pivoted together by means of a rivet, $a$. $a^1$ $a^1$ are the ends of said levers, bent to form hooks, as on ordinary pokers. At $a$ the bar A is bent so as to provide an expedient for lifting lids, while at $a^3$ the lever A' is bent outwardly, to form a holder for the stem $b$ of the scraper B, said stem being threaded and screwed tightly into said holder, as shown. The scraper and stem are adapted to be detached when found inconvenient. The operation of the levers as tongs is understood from the drawing.

I claim—

The scraper B, in combination with the levers A' of the combined poker and tongs A A', substantially as shown and described.

In testimony that I claim the foregoing I have hereunto set my hand this 25th day of February, 1875.

JOHN C. LIBE.

Witnesses:
GEO. C. SHELMERDINE,
M. DANL. CONNOLLY.